United States Patent
Kanevsky et al.

[11] Patent Number: 6,073,091
[45] Date of Patent: Jun. 6, 2000

[54] APPARATUS AND METHOD FOR FORMING A FILTERED INFLECTED LANGUAGE MODEL FOR AUTOMATIC SPEECH RECOGNITION

[75] Inventors: Dimitri Kanevsky, Ossining; Michael Daniel Monkowski, New Windsor, both of N.Y.; Jan Sedivy, Prague, Czech Rep.

[73] Assignee: International Business Machines Corporation, Armonk, N.Y.

[21] Appl. No.: 08/906,812

[22] Filed: Aug. 6, 1997

[51] Int. Cl.[7] .............................. G06F 17/28; G10L 5/06; G10L 9/00

[52] U.S. Cl. ................................. 704/9; 704/257

[58] Field of Search .................... 704/1, 9, 240, 704/243, 255, 256, 257; 707/530, 531

[56] References Cited

U.S. PATENT DOCUMENTS

| | | | |
|---|---|---|---|
| 5,467,425 | 11/1995 | Lau et al. | 704/243 |
| 5,490,061 | 2/1996 | Tolin et al. | 704/2 |
| 5,680,511 | 10/1997 | Baker et al. | 704/257 |
| 5,828,999 | 10/1998 | Bellegarda et al. | 704/240 |
| 5,835,888 | 11/1998 | Kanevsky et al. | 704/9 |

OTHER PUBLICATIONS

L. Bahl et al., F. Jelinek, R. Mercer, "A Maximum Likelihood Approach to Continuous Speech Recognition", IEEE Transactions on Pattern Analysis and Machine Intelligence, vol. PAMI–5, No. 2, Mar. 1983, pp. 179–190, IV, Language Modeling on p. 181.

*Primary Examiner*—Forester W. Isen
*Assistant Examiner*—Patrick N. Edouard
*Attorney, Agent, or Firm*—F.Chau & Associates, LLP

[57] ABSTRACT

A method of forming a language model for a language having a selected vocabulary of word forms comprises: (a) mapping the word forms into integer vectors in accordance with frequencies of word form occurrence; (b) partitioning the integer vectors into subsets, the subsets respectively having ranges of frequencies of word form occurrence associated therewith, the subsets being arranged in a descending order of frequency ranges; (c) respectively assigning maps to the subsets; (d) filtering a textual corpora using the maps assigned to the subsets in order to generate indexed integers; (e) determining n-gram statistics for the indexed integers; and (f) estimating n-gram language model probabilities from the n-gram statistics to form the language model.

27 Claims, 6 Drawing Sheets

APPARATUS AND METHOD FOR FORMING A FILTERED INFLECTED LANGUAGE MODEL FOR AUTOMATIC SPEECH RECOGNITION

BACKGROUND OF THE INVENTION

The present invention relates to speech recognition and, more particularly, to methods and apparatus for forming an inflected language model component of an automatic speech recognizer (ASR) that produces a compact and efficiently accessible set of 2-gram and 3-gram language model probabilities.

It is known that a relatively small vocabulary, e.g., 35,000 words, can represent more than 99% of the everyday spoken English language. A different situation exists for inflected languages that use large vocabularies having several million different word forms. For example, the Russian language requires at least 400,000 word forms to represent more than 99% of the everyday spoken Russian language. Such a large vocabulary cannot be used directly as a basic 1-gram component in a standard n-gram language module of a real-time ASR. In one approach for attempting to decrease the size of a basic vocabulary employed in Slavic language models, words are split into stems and endings and the following sets of statistics for components are found: trigrams for stems only, trigrams for endings only, and distributions of stems/endings. Such an approach is disclosed in U.S. Ser. No. 08/662,726 (docket no. YO995-208) filed on Jun. 10, 1996, entitled "Statistical Language Model for Inflected Languages." The resulting language model is based on the vocabulary of components and is a weighted sum of different language models of these components. The size of the vocabulary of components (stems and endings) may be an order of magnitude less than the size of the vocabulary of (non-split) words. Therefore, the language model that is based on components is more compact than the standard n-gram language model that is based on the whole (non-split) word form vocabulary. Nevertheless, the conventional language model formed from components requires consideration of 6 consequent components (stem-ending-stem-ending-stem-ending) in order to fetch trigram probabilities of some of its components (stems-stems-stems or ending-ending-ending). The consideration of 6-tuple strings can be computationally expensive for real time applications in ASR.

Another related problem is how to split words into stems and endings to get a sufficient compression of the size of the vocabulary of components (as compared to the vocabulary of non-split word forms). It is known that in order to split a vocabulary of word forms into stems and endings one can take a list of components (stems and endings) and then match word forms from the vocabulary with the list of components using some matching rules.

In different countries, e.g., Slavic countries, there exists some lists of components (stems and endings) that have been produced by groups of linguists (sometimes during several decades of work). These lists of components could be used to split the corresponding vocabularies of word forms into stems and endings and produce relevant language models of components as described in the Kanevsky et al. application cited above. However, these existing sources of components may not be satisfactory for practical applications of making a language model module in an ASR for several reasons. First, these sources of components may not cover all word forms in a particular vocabulary that is used in an ASR. Second, they may not provide a sufficient ratio of compression (i.e., a number of word forms to a number of components). Third, such a ratio of compression is rather a fixed number. As a result, the ratio cannot be easily varied as may sometimes be necessary for different practical applications that may involve vocabularies of different sizes (e.g., from several million word forms to hundreds of thousands of word forms). Lastly, it can be expensive to license a list of components (stems and endings) from its owner in order to produce and sell an ASR that employs such list of components in its language models. However, the production of a language's own list of components may require complicated algorithms and can be time consuming.

SUMMARY OF THE INVENTION

The present invention provides methods and apparatus for performing a unique procedure that consists of several steps. In one aspect of the invention, word forms are mapped into integer vectors. This assignment of integer vectors to word forms can be thought of as the splitting of word forms into a tuple of sub-words (e.g., prefix/stems/ending), numerating all these sub-words and thus getting tuples of indexed integers. It is to be understood that a "tuple" refers to an ordered set of components. For instance, 4-tuple of integers may be a set: (5, 2, 10, 120), while a 6-tuple of sub-words may be a set: (us, ed, in, speech, reco, gnition). Hence, an n-tuple means an ordered set of n components. Another way to assign integer vectors to word forms is to map word forms into classes or a hierarchy of classes. Then, numeration of classes and\members in classes gives rise to integer vectors. A preferred method for assigning integer vectors to word forms via mapping word numbers into residues and integer quotients by a mapping module will be described in detail later.

Next, the invention provides that a vocabulary is numerated in descending order (or equivalently, word forms are mapped into word numbers) in accordance with frequencies of word forms estimated from some textual corpora. Next, this numerated vocabulary is partitioned into several subsets of word forms from higher scores to lower scores (e.g., the first subset having word forms with word numbers from about 1 to about 40,000; the second subset having word forms with word numbers from about 40,001 to about 400,000; etc.). Each of these subsets is assigned with a different map (of word forms to integer vectors). For example, word forms in a first subset with the highest frequency scores are mapped into word numbers (or equivalently, into 1-dimensional integer vectors), the next subset of word forms (with the closest lower frequency scores to the first subset) is mapped into a subset of 2-dimensional vectors (that can be thought of as a set of pairs of "word numbers" for stems and endings into which corresponding word forms are split) and so on.

Next, these maps are used to filter a large textual corpora, i.e., map words into integer vectors or (equivalently) into tuples of indexed integers. It is to be noted that integers that belong to 1-dimensional vector components are distinguished from integers that belong 2-dimensional integer components, etc. Next, n-gram statistics for 2-gram and 3-gram tuples of indexed integers are determined just as n-gram statistics are found for n-tuples of words in conventional methods. However, the set of n-grams statistics for indexed integers determined in accordance with the present invention requires less storage than a set of ordinary n-gram statistics for word forms and can be efficiently accessed. Finally, a probability score for a tuple of word forms is obtained as a product of probability scores of corresponding 1-gram, 2-gram and 3-gram tuples of indexed integers.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
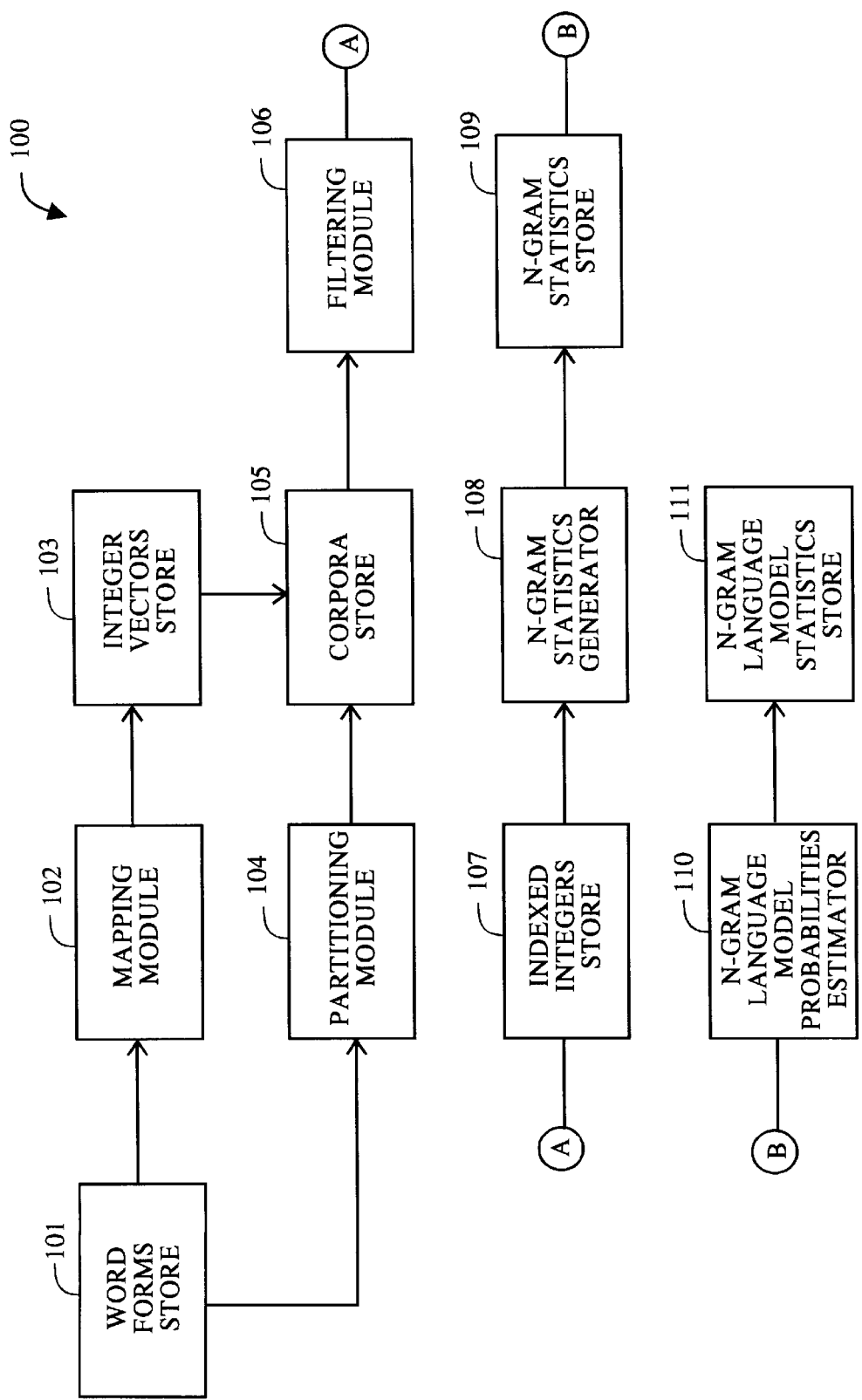
FIG. 1 is a block diagram illustrating the main functional components of a preferred form of the present invention.

Referring initially to FIG. 1, apparatus 100 for forming a filtered inflected language model for use by an automatic speech recognition system is shown. Specifically, the apparatus 100 includes a word forms store 101 which is operatively coupled to a mapping module 102 and a partitioning module 104. The mapping module 102 is operatively coupled to an integer vectors store 103. The integer vectors store 103 and the partitioning module are operatively coupled to a corpora store 105. The corpora store 105 is operatively coupled to a filtering module 106 which is operatively coupled to an indexed integers store 107. An n-gram statistics generator 108 is operatively coupled to the indexed integers store 107 and an n-gram statistics store 109 is operatively coupled to the n-gram statistics generator 108. Finally, an n-gram language model probabilities estimator 110 is operatively coupled to the n-gram statistics store 109 and an n-gram language model probabilities store 111 is operatively coupled to the n-gram language model probabilities estimator 110.

In general, word forms store 101 stores a vocabulary of different word forms, for example, from the Russian language. The vocabulary is mapped into integer vectors by mapping module 102, which will be explained below in the context of FIG. 2. The integer vectors are stored in integer vectors store 103. The vocabulary is also partitioned into subsets by the partitioning module 104, which will be explained below in the context of FIG. 3. Next, the textual corpora, stored in corpora store 105 is filtered in filtering module 106 in order to generate indexed integers using the maps employed in mapping module 102 and the dictionary partition used in partitioning module 104. The filtering process will be explained below in the context of FIG. 4. The indexed integers are stored in indexed integer store 107. A set of n-gram statistics are generated by n-gram statistics generator 108 from the indexed integers and stored in n-gram statistics store 109, which will be explained below in the context of FIG. 5. Next, n-gram language model probabilities are estimated by an n-gram language model probabilities estimator 110 using the n-gram statistics to yield n-gram language model statistics which are stored in an n-gram language model statistics store 111. This portion of the process will be explained below in the context of FIG. 6.

Figure 2:
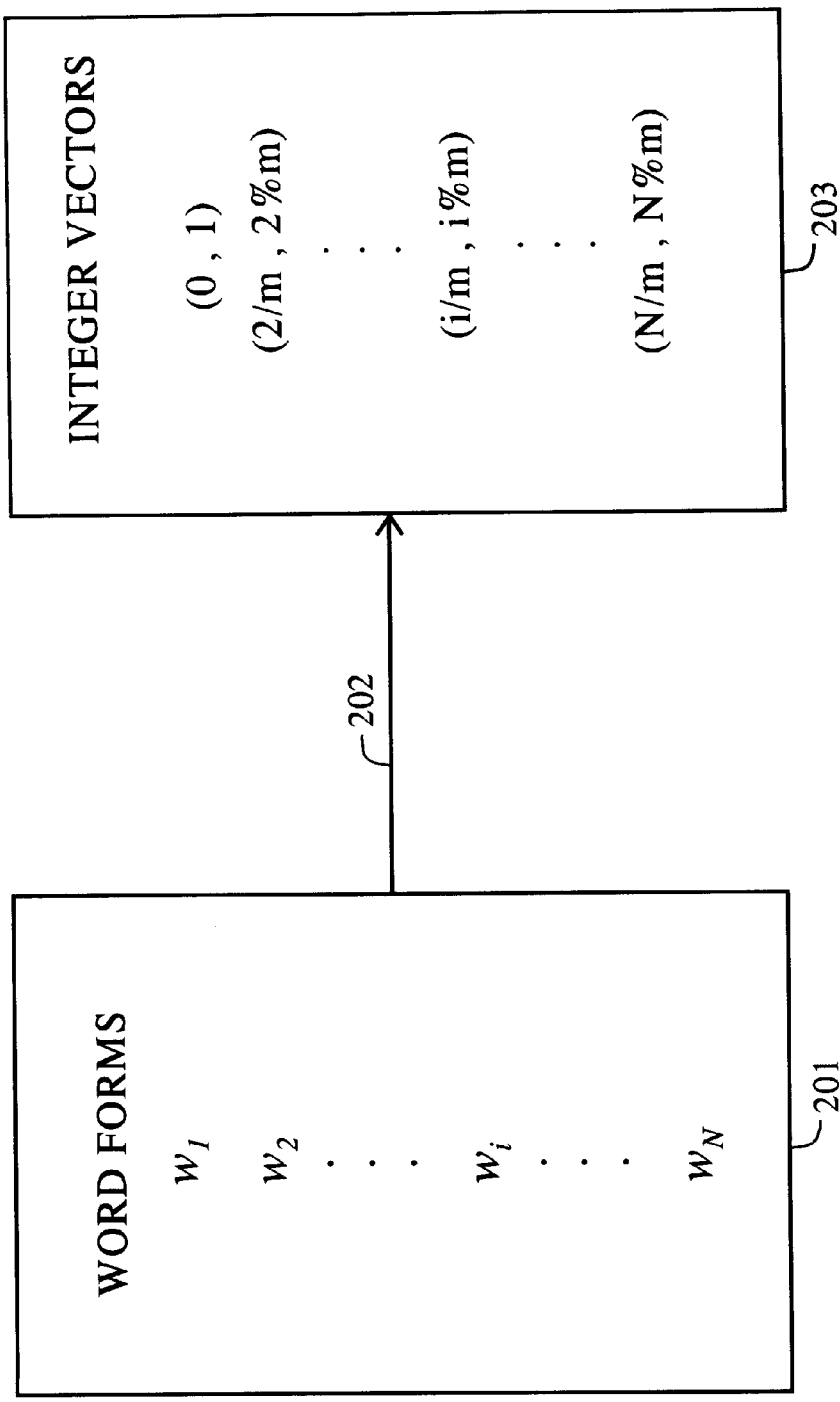
FIG. 2 is a block diagram/flow chart illustrating mapping word forms into integer vectors according to the invention.

Referring now to FIG. 2, a preferred form of mapping word forms into integer vectors (i.e., vectors with integer components) as performed by mapping module 102 is shown. A map 202 serves to map word forms V 201 into a set of 2-dimensional integer vectors $\hat{V}$ 203. The map 202 is infective (different word forms are mapped into different integer vectors). All word forms $V=\{w_i\}$ are numerated in accordance with their frequencies in descending order from 1 to N where N is the size of the vocabulary of word forms. It is to be appreciated that these frequencies can be estimated from some large textual corpora. Let, for example, N=400,000. Consider the following map $T_m: V \rightarrow \hat{V}$, $w_i \rightarrow (i/m, i \% m)$ where m is some integer less than N (let m=100) and i/m is an integer division (e.g., 57/100=0; 321/100=3) and i % m is a residue (e.g. 57% 100=57; 321% 100=21). A first component of an integer vector may be referred to as a "stem" and a second component as an "ending" and, thus, the map $T_m$ may be considered as a "split" of words using "idealized" vocabulary of integers.

It is to be appreciated that several alternative maps may be used by the mapping module 202 to map the word forms to integer vectors and, thus, the map is not to be limited to the mapping scheme illustrated in FIG. 2. By way of a first alternative example, the above map can be extended to 3-tuple and any k-tuple of integers by applying $T_m$ iteratively to last components in integer vectors (with decreasing m at each step). For example, a 3-tuple integer from a number $T_m: T_m(i)=(i_1, i_2)$ and then applying $T_{m1}$ to $i_2$. By way of a second alternative example, word forms may be split into stems and endings, the stems and endings may then be numerated in accordance with their frequencies and then word forms are mapped into corresponding stem and ending numbers. By way of a third alternative example, word forms may be clustered into classes, the classes and members in classes may be numerated and the word forms mapped into corresponding class and member numbers.

Figure 3:
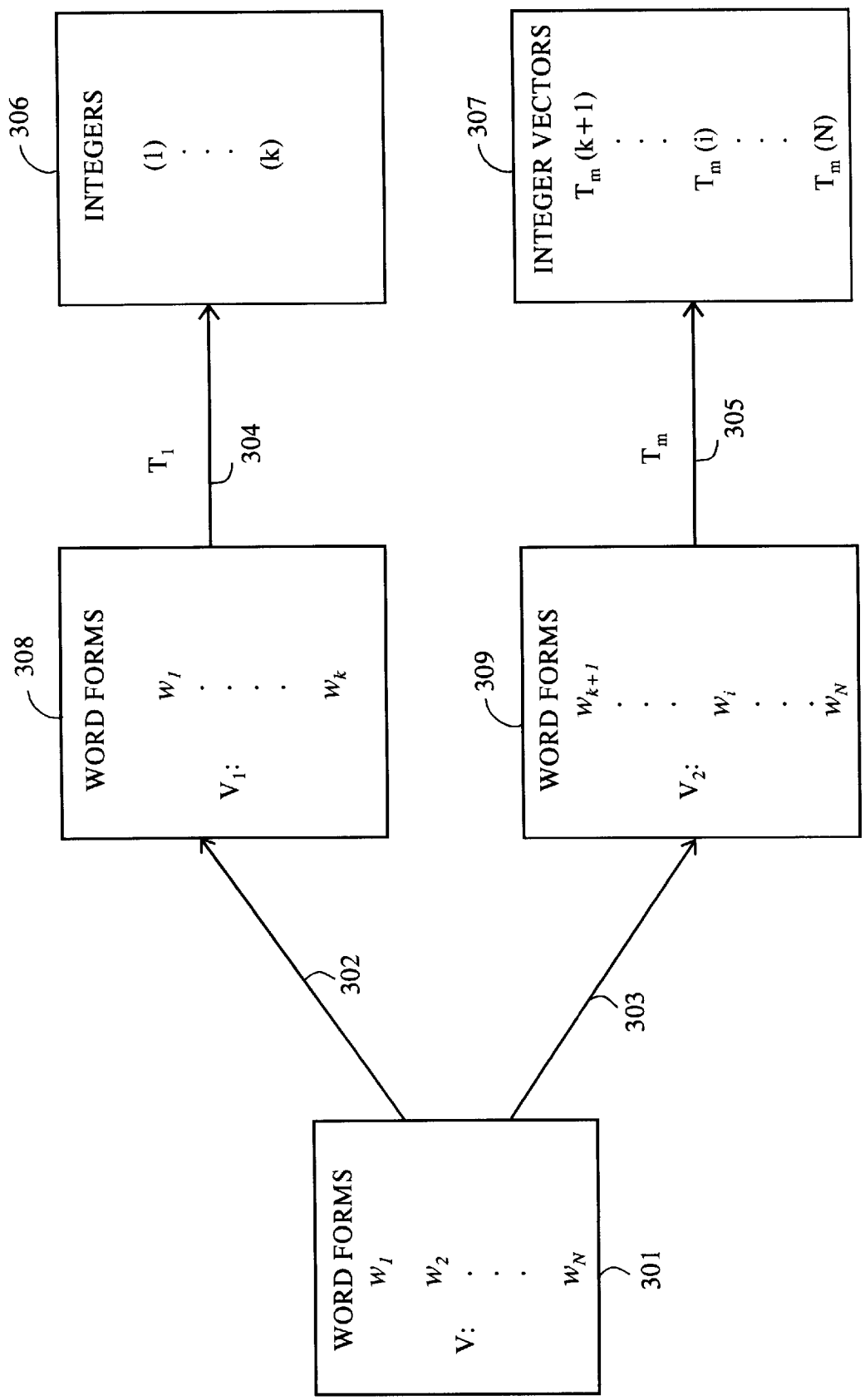
FIG. 3 is a block diagram/flow chart illustrating partitioning of a vocabulary according to the invention.

Referring now to FIG. 3, a preferred form of partitioning of a vocabulary into subsets and assigning different maps to each of the subsets as performed by the partitioning module 104 is shown. The vocabulary V 301 in FIG. 3 can be split (as shown at 302 and 303) into two subsets: $V_1=\{w_1, \ldots, W_k\}$ (block 308) and $V_2=\{W_{k+1}, \ldots, W_N\}$ (block 309), where k=40,000. To the subset $V_1$, the map $T_1: V_1 \rightarrow \hat{V}$ (304) is assigned to generate integers 1 . . . k (block 306), such that $w_i \rightarrow (i)$. The subset $V_2$ is mapped via $T_m: V_2 \rightarrow \hat{V}_2$ (305) to generate integer vectors $T_m(k+1) \ldots T_m(N)$ (block 309), such that $w_i \rightarrow (i/m, i \% m)$ for m=100.

Figure 4:
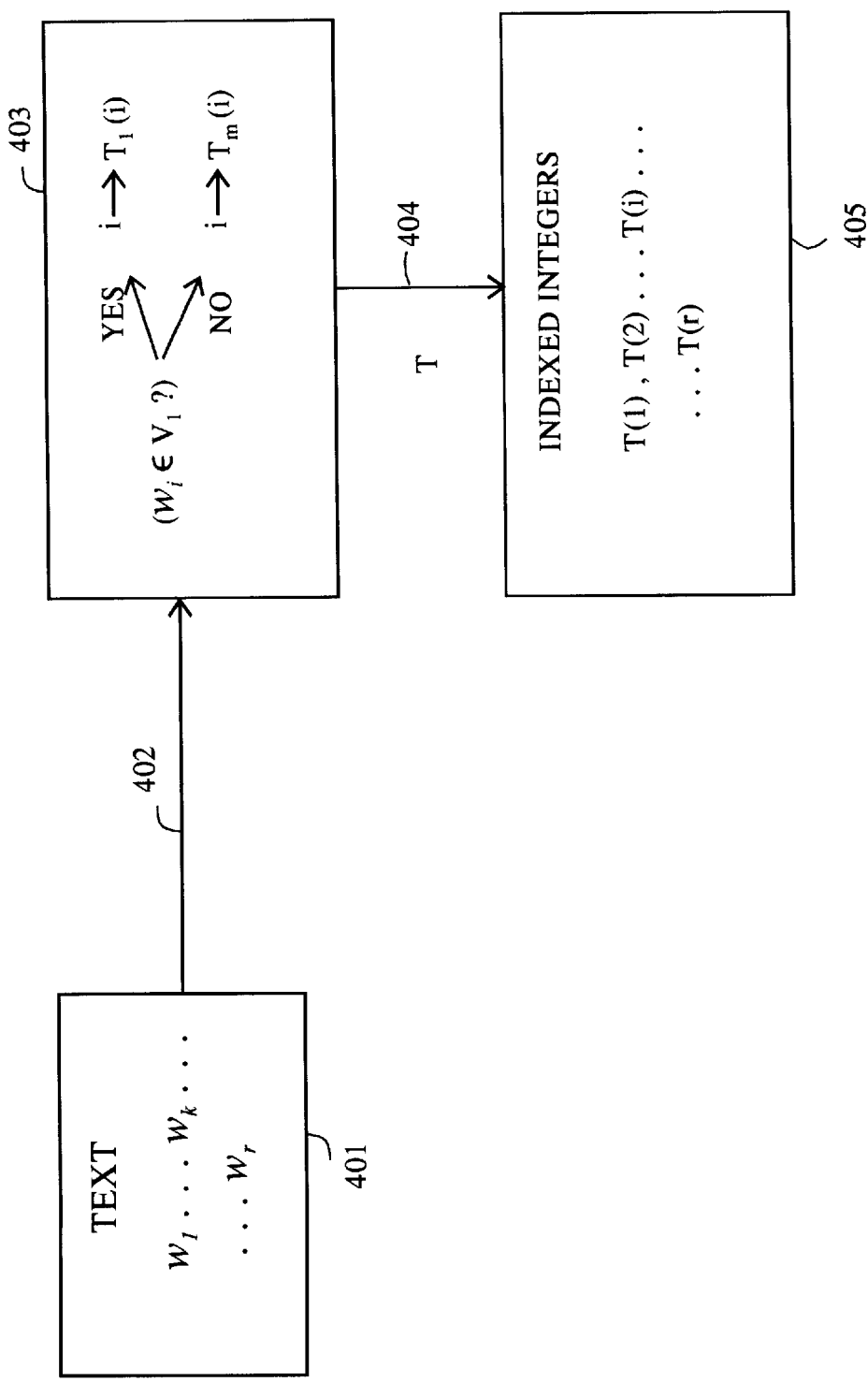
FIG. 4 is a block diagram/flow chart illustrating filtering of a textual corpora according to the invention.

Referring now to FIG. 4, a preferred form of filtering a large corpora as performed by the filtering module 106 is shown. Let a textual corpora C consist of words $\{w_1, \ldots, w_r\}$ where r is the number of words in the text C (block 401). We map (402 and 404) C to a string of integer vectors $\hat{C}$ (block 405) via the map $T_{V1,V2}=T$ that is defined in block 403 as follows: if w belongs to $V_1$, then $T(w)=T_1(w)$; else if w belongs $V2$, then $T(w)=T_2(w)$. In other words, if a word in a text has a high frequency (i.e., belongs $V_1$), it is "not split", i.e., mapped into the word number. Otherwise, if a word has a relatively low frequency (i.e., belongs to $V_2$), then it is "split", i.e., mapped into two numbers ("stem" and "ending"). A set of integer vectors $\hat{C}$ (block 405) is considered as a set of indexed integers. The indexes denote whether an integer came from a map $T_1$ (i.e., it is a one-dimensional integer vector) or whether it is the first or second component in a 2-dimensional integer vector (an image of the map $T_2$).

Figure 5:
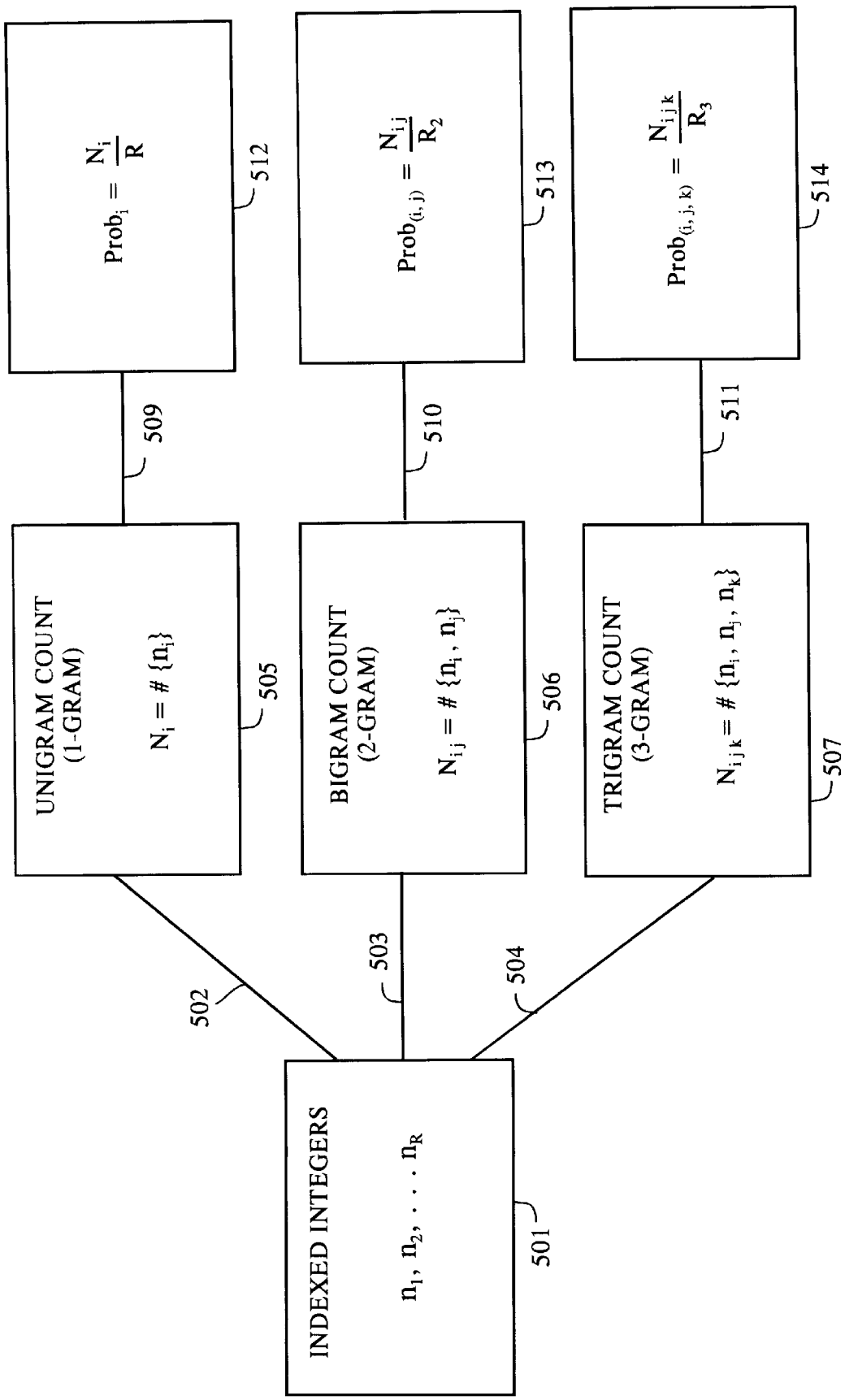
FIG. 5 is a block diagram/flow chart illustrating generation of n-gram statistics of indexed integers according to the invention.

This corresponds to 510 in FIG. 5. For example, if $T(1)=5$, $T(2)=(8, 6)$, $T(3)=(99, 3)$, ... $T(r)=7$, then a corresponding string of indexed integers could be $5_0, 8_1, 6_2, 3_0, 99_1, 3_2, 7_0$, where a subscript 0 means the component of a 1-dimensional vector, a subscript 1 means a first component of a 2-dimensional vector, and a subscript 2 means a second component of a 2-dimensional vector. It is to be noted that, for simplicity, these indexes will not be written explicitly in formulas below when strings of indexed integers are considered.

Referring now to FIG. 5, a preferred form of generating n-gram statistics for strings of indexed integers, as performed by n-gram statistics generator 108, is shown. First, 1-gram, 2-gram, 3-gram statistics are defined on a set of indexed integers in Ĉ, as follows. Different indexed integers (block 501) are considered as an "idealized" vocabulary $\hat{V}$ and the set Ĉ as a "text" consisting of "words" from $\hat{V}$. Then, n-gram statistics for indexed integers are defined as n-gram statistics for "words" from $\hat{V}$ in the "text" Ĉ (as shown at 502, 503 and 504). For example, let R be a number of all different indexed integers in Ĉ and $N_i$ be a count of an indexed integer i in this text (block 505). Then (as shown at 509), the ratio $N_i/R$ (block 512) estimates a probability of the indexed integer n. Similarly, 2-gram probabilities are defined (blocks 506, 510 and 513) and 3-gram probabilities (blocks 507, 511 and 514). It is to be noted that the size of the vocabulary of indexed integers $\hat{V}$ does not exceed the size of the set $V_1$ plus $2 \times m$, e.g., $40,000+200=40,200$ in the example. Advantageously, the set of n-gram statistics for indexed integers formed according to the invention is more compact than the set of n-gram statistics for words from the vocabulary V that, in our example, consists of 400,000 words.

Figure 6:
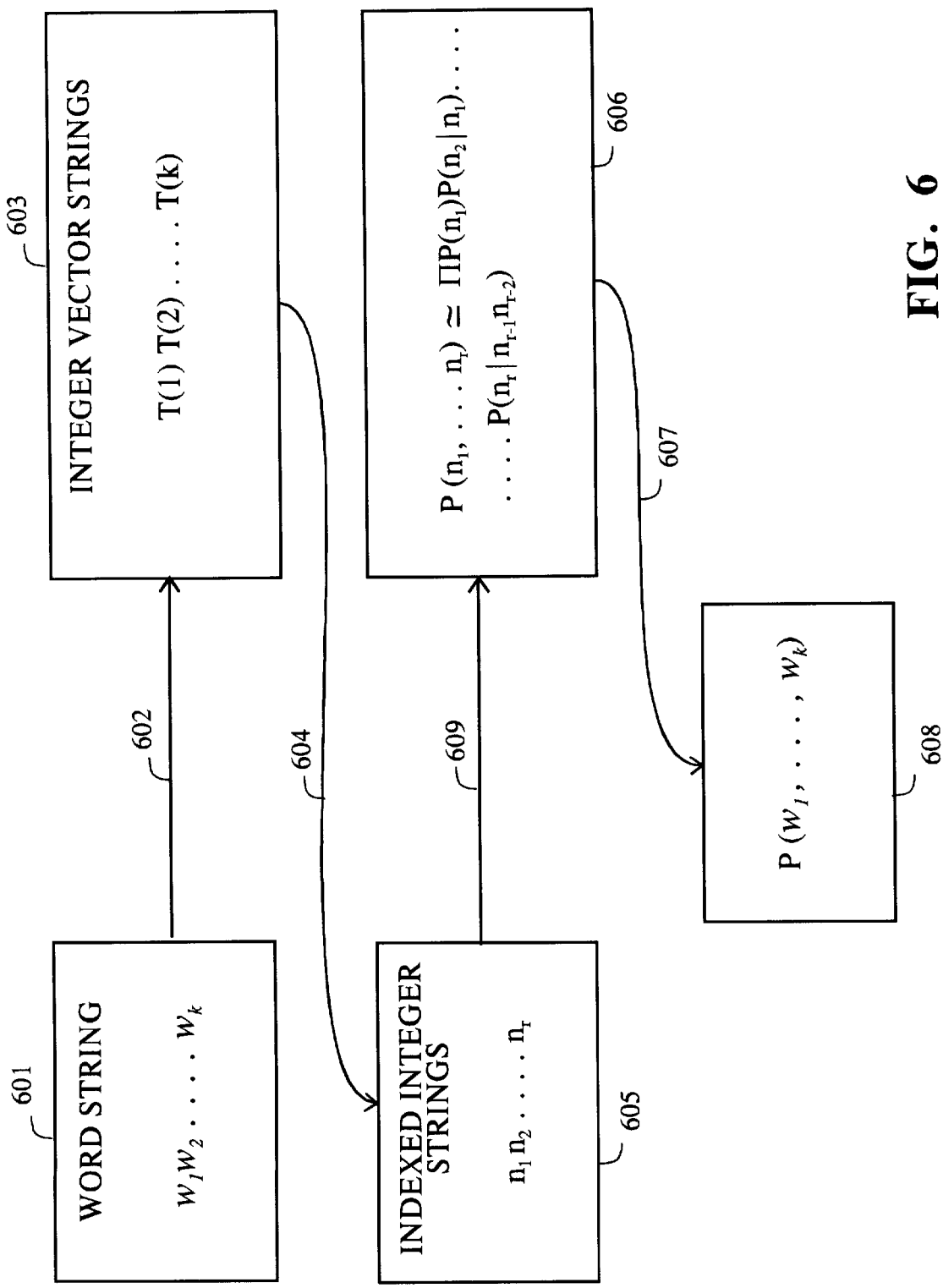
FIG. 6 is a block diagram/flow chart illustrating derivation of language model probability scores for words from probability scores of corresponding tuples of indexed integers.

Referring now to FIG. 6, a preferred form of efficient assignment of 2-gram and 3-gram probabilities to 2-tuple and 3-tuple of words via corresponding n-gram statistics of integer vectors, as performed by the n-gram language model probabilities estimator 110, is shown. Let $W_1^x = w_1 w_2 w_3 \ldots W_k$ (block 601) be a string of words from the vocabulary V. Then, $T(W)=T(w_1)T(w_2)T(w_3) \ldots T(w_k)=n_1 n_2 \ldots n_r = n_1^r$ is a string of indexed integers (block 603 via 602 and block 605 via 604). A probability score P(W) (block 608 via 607) is defined as a probability score $P(n_1^r)$ (block 606) of a string $n_1^r$ (block 605 via 609) using n-gram statistics for indexed integers generated by the n-gram statistics generator 108 and stored in store 109. It is to be appreciated that n-gram statistics for strings of indexed integers are generated similarly as n-gram statistics for strings of words. See, for example, the reference: L. Bahl, F. Jelinek, R. Mercer, "A Maximum Likelihood Approach to Continuous Speech Recognition", IEEE Transactions on Pattern Analysis and Machine Intelligence, Vol. PAMI-5, No. 2, March 1983, pp. 179–190, IV, Language Modelling on p. 181. It is to be noted that if $k=2$ and $w_1$ belongs to $V_1$ and $w_2$ belongs to $V_2$ then $r=3$, i.e., T(w) consists of 3 indexed integers and a 2-gram probability $P(w_1 w_2)$ is estimated using 3-gram probabilities of 3 indexed integers that can be defined as follows: product $P(n_1)P(n_2|n_1)P(n_3|n_2 n_1)$. But, if $k=3$ and all $w_1$, $w_2$, $w_3$ belongs to $V_1$ then a probability of W is estimated from a probability of 3-tuple of indexed integers. In other words, the standard trigram statistics are employed for most frequently encountered words. For less frequently encountered words (that are split into "stems" and "endings"), this method provides statistical information that is equivalent to bigram language modules for "non-split" words.

In a preferred embodiment, the means for/step of mapping further include attributing word numbers to the word forms and then mapping the word numbers into integer vectors including integer quotients and integer residues. Moreover, integer quotient and integer division are applied to a last component of an integer vector to generate a longer integer vector.

It is to be understood that the functional modules for performing the functions of the present invention, as described above, may be implemented in hardware, software or a combination thereof. Preferably, the invention is implemented in software and executed on an appropriately programmed general purpose digital computer.

It is to be further understood that an automatic speech recognition system that employs a filtered inflected language model formed in accordance with the apparatus and methods of the present invention may include conventional speech recognition components. That is, an audio-to-electrical signal transducer (e.g., microphone) may be used to receive spoken utterances of a speaker. A feature extractor may then be used to extract feature vector signals from the electrical signals which represent the spoken utterances by employing known feature extraction techniques. The feature vector signals are then decoded using the language model formed in accordance with the present invention in order to generate a decoded representation of the spoken utterance. This decoded representation may then be output to an electrical-to-audio transducer (e.g., speaker), a display or to another system depending on the specific application for which the automatic speech recognition is employed.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of forming a language model for a language having a selected vocabulary of word forms, the method comprising the steps of:
   (a) mapping the word forms into integer vectors in accordance with frequencies of word form occurrence;
   (b) partitioning the integer vectors into subsets, the subsets respectively having ranges of frequencies of word form occurrence associated therewith, the subsets being arranged in a descending order of ranges;
   (c) respectively assigning maps to the subsets;
   (d) filtering a textual corpora using the maps assigned to the subsets in order to generate indexed integers;
   (e) determining n-gram statistics for the indexed integers;
   (f) estimating n-gram language model probabilities from the n-gram statistics to form the language model; and
   (g) determining a probability of a word sequence uttered by a speaker, using said language model.

2. The method of claim 1, wherein the mapping step further includes attributing word numbers to the word forms and then mapping the word numbers into integer vectors including integer quotients and integer residues.

3. The method of claim 1, wherein the mapping step further includes applying integer quotient and integer division to a last component of an integer vector thereby generating a longer integer vector.

4. The method of claim 1, wherein the mapping step further includes:
   splitting the word forms into stems and endings;
   numerating the stems and endings in accordance with their respective frequencies of occurrence; and assigning the split word forms to corresponding stem and ending numbers.

5. The method of claim 1, wherein the mapping step further includes:

clustering the word forms into classes, the classes having members associated therewith;

numerating the classes and the members in the classes; and assigning the clustered word forms to corresponding class and member numbers.

6. The method of claim 1, wherein the partitioning step further includes determining the range of frequencies from frequency scores estimated from a textual corpora.

7. The method of claim 6, wherein a first subset having a highest frequency score includes word forms mapped into one-dimensioned vectors.

8. The method of claim 7, wherein a second subset having a next highest frequency score includes word forms mapped into two-dimensional vectors.

9. The method of claim 8, wherein an n-th subset having an n-th highest frequency score includes word forms mapped into n-dimensional vectors.

10. The method of claim 1, wherein if a word in the textual corpora has a high frequency of occurrence, then the word is mapped to a word number, else if the word has a relatively low frequency of occurrence, then the word is split and mapped to two word numbers.

11. The method of claim 1, wherein the determining step further includes determining the n-gram statistics for bigram and trigram tuples of indexed integers.

12. The method of claim 1, wherein the determining step further includes determining the n-gram statistics for n-tuples of indexed vectors.

13. The method of claim 1, wherein the estimating step further includes generating a probability score for a tuple of word forms as a product of corresponding unigram, bigram and trigram tuples of indexed integers.

14. Apparatus for forming a language model for a language having a selected vocabulary of word forms, the apparatus comprising:

means for mapping the word forms into integer vectors in accordance with frequencies of word form occurrence;

means for partitioning the integer vectors into subsets, the subsets respectively having ranges of frequencies of word form occurrence associated therewith, the subsets being arranged in a descending order of ranges;

means for respectively assigning maps to the subsets;

means for filtering a textual corpora using the maps assigned to the subsets in order to generate indexed integers;

means for determining n-gram statistics for the indexed integers;

means for estimating n-gram language model probabilities from the n-gram statistics to form the language model; and means for determining a probability of a word sequence uttered by a speaker, using said language model.

15. The apparatus of claim 14, wherein the mapping means further includes means for attributing word numbers to the word forms and then mapping the word numbers into integer vectors including integer quotients and integer residues.

16. The apparatus of claim 14, wherein the mapping means further includes means for applying integer quotient and integer division to a last component of an integer vector thereby generating a longer integer vector.

17. The apparatus of claim 14, wherein the mapping means further includes:

means for splitting the word forms into stems and endings;

means for numerating the stems and endings in accordance with their respective frequencies of occurrence; and means for assigning the split word forms to corresponding stem and ending numbers.

18. The apparatus of claim 14, wherein the mapping means further includes:

means for clustering the word forms into classes, the classes having members associated therewith;

means for numerating the classes and the members in the classes; and means for assigning the clustered word forms to corresponding class and member numbers.

19. The apparatus of claim 14, wherein the partitioning means further includes means for determining the range of frequencies from frequency scores estimated from a textual corpora.

20. The apparatus of claim 19, wherein a first subset having a highest frequency score includes word forms mapped into one-dimensional vectors.

21. The apparatus of claim 20, wherein a second subset having a next highest frequency score includes word forms mapped into two-dimensional vectors.

22. The apparatus of claim 21, wherein an n-th subset having an n-th highest frequency score includes word forms mapped into n-dimensional vectors.

23. The apparatus of claim 14, wherein if a word in the textual corpora has a high frequency of occurrence, then the word is mapped to a word number, else if the word has a relatively low frequency of occurrence, then the word is split and mapped to two word numbers.

24. The apparatus of claim 14, wherein the determining means further includes means for determining the n-gram statistics from bigram and trigram tuples of indexed integers.

25. The apparatus of claim 14, wherein the determining means further includes means for determining the n-gram statistics for n-tuples of indexed vectors.

26. The apparatus of claim 14, wherein the estimating means further includes means for generating a probability score for a tuple of word forms as a product of corresponding unigram, bigram and trigram tuples of indexed integers.

27. A program storage device readable by machine, tangibly embodying a program of instructions executable by the machine to perform method steps for forming a language model for a language having a selected vocabulary of word forms, the method comprising the steps of:

(a) mapping the word forms into integer vectors in accordance with frequencies of word form occurrence;

(b) partitioning the integer vectors into subsets, the subsets respectively having ranges of frequencies of word form occurrence associated therewith, the subsets being arranged in a descending order of ranges;

(c) respectively assigning maps to the subsets;

(d) filtering a textual corpora using the maps assigned to the subsets in order to generate indexed integers;

(e) determining n-gram statistics for the indexed integers;

(f) estimating n-gram language model probabilities from the n-gram statistics to form the language model; and (g) determining a probability of a word sequence uttered by a speaker, using said language model.

* * * * *